United States Patent
Linden

(10) Patent No.: US 7,209,822 B2
(45) Date of Patent: Apr. 24, 2007

(54) METHOD FOR SELECTING A TARGET VEHICLE

(75) Inventor: Thomas Linden, Simmozheim (DE)

(73) Assignee: DaimlerChrysler AG, Stuttgart (DE)

( * ) Notice: Subject to any disclaimer, the term of this patent is extended or adjusted under 35 U.S.C. 154(b) by 61 days.

(21) Appl. No.: 10/943,231

(22) Filed: Sep. 17, 2004

(65) Prior Publication Data

US 2005/0102089 A1    May 12, 2005

(30) Foreign Application Priority Data

Sep. 20, 2003  (DE) .............................. 103 43 684

(51) Int. Cl.
*B60K 31/00* (2006.01)
*G01S 13/72* (2006.01)

(52) U.S. Cl. ........................ 701/96; 340/903
(58) Field of Classification Search .................... None
See application file for complete search history.

(56) References Cited

U.S. PATENT DOCUMENTS 5,165,108 A * 11/1992 Asayama ..................... 340/435
5,168,355 A * 12/1992 Asayama ..................... 348/118
5,304,980 A *  4/1994 Maekawa .................... 340/435
5,369,590 A * 11/1994 Karasudani ................. 701/300
5,529,139 A *  6/1996 Kurahashi et al. .......... 180/169
6,681,170 B2 *  1/2004 Winner et al. ................ 701/93
6,945,346 B2 *  9/2005 Massen ....................... 180/170

FOREIGN PATENT DOCUMENTS

DE        41 07 177 A1    9/1991
JP         06-84099    *   3/1994

* cited by examiner

*Primary Examiner*—Michael J. Zanelli
(74) *Attorney, Agent, or Firm*—Crowell & Moring LLP

(57) ABSTRACT

A method selects a target vehicle located in front of a vehicle in the driving direction of the second-mentioned vehicle. The selection of the target vehicle is used in particular to automatically control the distance between the second-mentioned vehicle and the target vehicle. A preceding vehicle that can be selected as a target vehicle is recognized if a sensor unit has detected an object in front of the vehicle in the driving direction and a selection condition for this object is satisfied. Whether the selection condition is satisfied depends on the result of an evaluation of dynamic parameters of the vehicle and/or the object. The presence of a selectable preceding vehicle is indicated to the driver, and the driver can select the selectable preceding vehicle as a target vehicle by a confirmation.

12 Claims, 2 Drawing Sheets

METHOD FOR SELECTING A TARGET VEHICLE

BACKGROUND OF THE INVENTION

This application claims the priority of DE 10343684.7, filed Sep. 20, 2003, the disclosure of which is expressly incorporated by reference herein.

The present invention relates to a method for selecting a target vehicle that is located in front of a vehicle in driving direction of the vehicle, and more particularly, to a method to control a distance between the following vehicle and the target vehicle, comprising recognizing a preceding vehicle selectable as the target vehicle when a sensor unit has detected an object in front of the following vehicle in the driving direction and a selection condition is satisfied for the object, indicating a presence of the selectable preceding vehicle to a driver of the following vehicle and selecting the selectable preceding vehicle as a target vehicle by a confirmation of the driver.

Such a method is generally disclosed, for example, in DE 410 71 77 A1, in which a vehicle driving in front is detected by image sensors, and the image is displayed on the screen of a display device. If the image of the vehicle ahead is within an image monitoring window, this vehicle is selected as the target vehicle as soon as the driver actuates a control switch. The image monitoring unit then automatically tracks the target vehicle.

SUMMARY OF THE INVENTION

A disadvantage of this known method is that not every object located in front of the vehicle in the driving direction, or every vehicle driving ahead detected by a sensor unit of the vehicle can serve as a target vehicle. Thus, an object of the present invention is to offer the driver only those detected objects for selection as target vehicles that are suitable for the purpose, while taking into account the traffic or driving situation.

This object has been attained according to the present invention by a method in which the target vehicle selection condition is satisfied in dependence on the result of dynamic parameters of the vehicle and/or the object. An object detected by the sensor unit is offered to the driver as a selectable preceding vehicle only if the selection condition is satisfied. The selection condition takes into account dynamic parameters of the vehicle and/or the detected object. As a function of the evaluation result of these vehicle dynamic parameters, the system then decides whether the detected object will be indicated to the driver as a selectable preceding vehicle.

The present invention thus prevents objects from being offered as selectable preceding vehicles for the driver to select as target vehicles in certain traffic or driving situations even though controlling the relative distance between the vehicle and the offered selectable preceding vehicle is not, or only to a limited extent, possible. This can be the case, for example, if the relative distance to the detected object is so large that the sensor unit is working in its maximum range, so that an automatic control of the relative distance is possible only to a limited extent if a reliable detection of the object is to be ensured.

The selection condition can depend on the longitudinal vehicle dynamics. In particular, at a longitudinal vehicle speed that is greater than a predefined first speed threshold value a first selection condition can apply, and at a longitudinal vehicle speed that is less than or equal to the first speed threshold value a second selection condition different from the first selection condition can apply. As a result, the criteria for the decision whether a detected object is suitable as a target vehicle can be adapted to the momentary longitudinal dynamics of the vehicle and, in particular, the longitudinal speed of the vehicle, by a correspondingly adapted selection condition.

The vehicle dynamic parameters that are evaluated in connection with the selection condition are, for example, the relative distance between the vehicle and the object in vehicle driving direction and/or the relative speed between the vehicle and the object in vehicle driving direction. An object comes into consideration as a target vehicle and is therefore offered to the driver as a selectable preceding vehicle only if the relative position and/or the relative movement between the vehicle and the detected object fall within a predefined range. Only then is it possible to effect reliable automatic control of the relative distance between the vehicle and a target vehicle.

Advantageously, the dynamic parameters that are evaluated for checking the selection condition are one or more of the longitudinal speed and/or the longitudinal acceleration of the object in the driving direction of the vehicle, the lateral speed and the lateral acceleration of the object perpendicular to the driving direction of the vehicle. If the final speed of the object relative to the vehicle in the driving direction or perpendicular to the driving direction of the vehicle, or the change in the relative speed in longitudinal or transverse direction is too great, automatic control of the relative distance between the vehicle and the object cannot be guaranteed, so that in this case, too, the detected object cannot be offered to the driver as a selectable preceding vehicle because such an object is not suitable as a target vehicle.

It is furthermore advantageous to cancel the selectability of the preceding vehicle selectable as a target vehicle if an abort condition is satisfied. This abort condition is satisfied in particular if the preceding vehicle has left the detection range of the sensor unit of the vehicle, or if the relative distance between the vehicle and the preceding vehicle exceeds an upper distance limit, or if the longitudinal speed of the preceding vehicle and/or the vehicle exceeds an upper speed limit. If even one of these criteria is satisfied, it is no longer possible to guarantee a perfect automatic distance control between the vehicle and the target vehicle, so that the abort condition is satisfied and the selectability is canceled. In this case the driver can no longer select the detected object as the target vehicle through confirmation.

With the driver's manual confirmation of a selectable preceding vehicle, a distance control mode of the vehicle can be activated. In this distance control mode, the system controls the longitudinal dynamics of the vehicle to maintain a safe distance between vehicles. As a result, driving safety is increased in the distance control mode. By automatically controlling, for example, the power train or the brakes of the vehicle, the system maintains a safety-critical minimum distance.

It is furthermore advantageous if the distance control mode is terminated if a termination criterion is satisfied. The termination criterion is satisfied, for example, if the driver manually cancels the distance control mode. Furthermore, the criteria satisfying the abort conditions can also be used for the termination criterion. Hence, the distance control mode is terminated if based on the driving or traffic situation it is no longer possible to ensure a flawless functioning of the distance control mode or if the driver no longer wants the support of the automatic control of the distance to the target vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
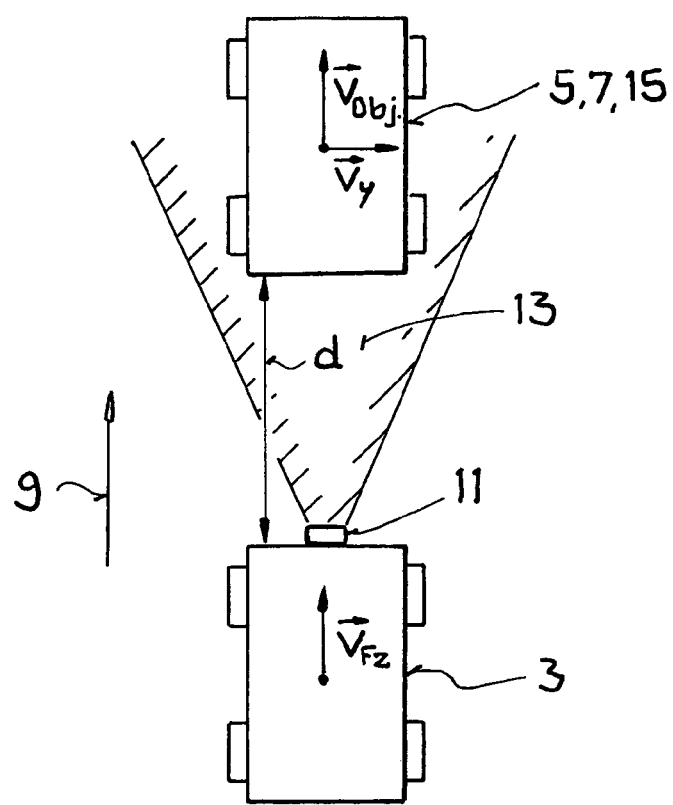
FIG. 1 is a schematic top view of a vehicle and a target vehicle.

The method according to the invention serves to select a vehicle 5 that is driving ahead of a vehicle 3 as a target vehicle 7. This situation is schematically illustrated in FIG. 1. The vehicle 3 has a sensor unit 11 transmitting in the driving direction 9 of the vehicle 3 to detect objects such as object 15. The transmission angle and the range of the sensor unit 11 define a detection range 13 in which the objects 15, such as a vehicle driving ahead or preceding vehicle 5, can be detected. According to FIG. 1, the tail of the preceding vehicle 5 is within the detection range 13, such that the detection unit 11 detects the preceding vehicle 5.

The selection of a target vehicle 7 is intended for an automatic control of the distance between the vehicle 3 and the target vehicle 7. In other words, the relative distance between the vehicle and the target vehicle 7 is to be controlled independent of the driver. For example, if a target vehicle 7 is selected, a distance control mode is activated, which ensures that a safe distance is maintained. As soon as the vehicle threatens to fall short of the safe distance, the system automatically intervenes in the longitudinal dynamics of the vehicle 3, particularly in the power train and the vehicle braking system to maintain the safety distance. Thus, when the distance control mode of the vehicle 3 is activated, the system prevents the vehicle 3 from driving too close to the target vehicle 7, independent of the driver.

Since it may nevertheless be necessary to briefly go below this safe distance in certain traffic situations, the driver can briefly reduce the relative distance between the vehicle 3 and the target vehicle 7 to below the predefined safe distance even if the distance control mode is activated. This is accomplished, for example, by pushing the accelerator pedal of the vehicle 3 to the floor, also referred to as kickdown. Of course, other manual operating processes can be used to override the distance control mode.

Figure 2:
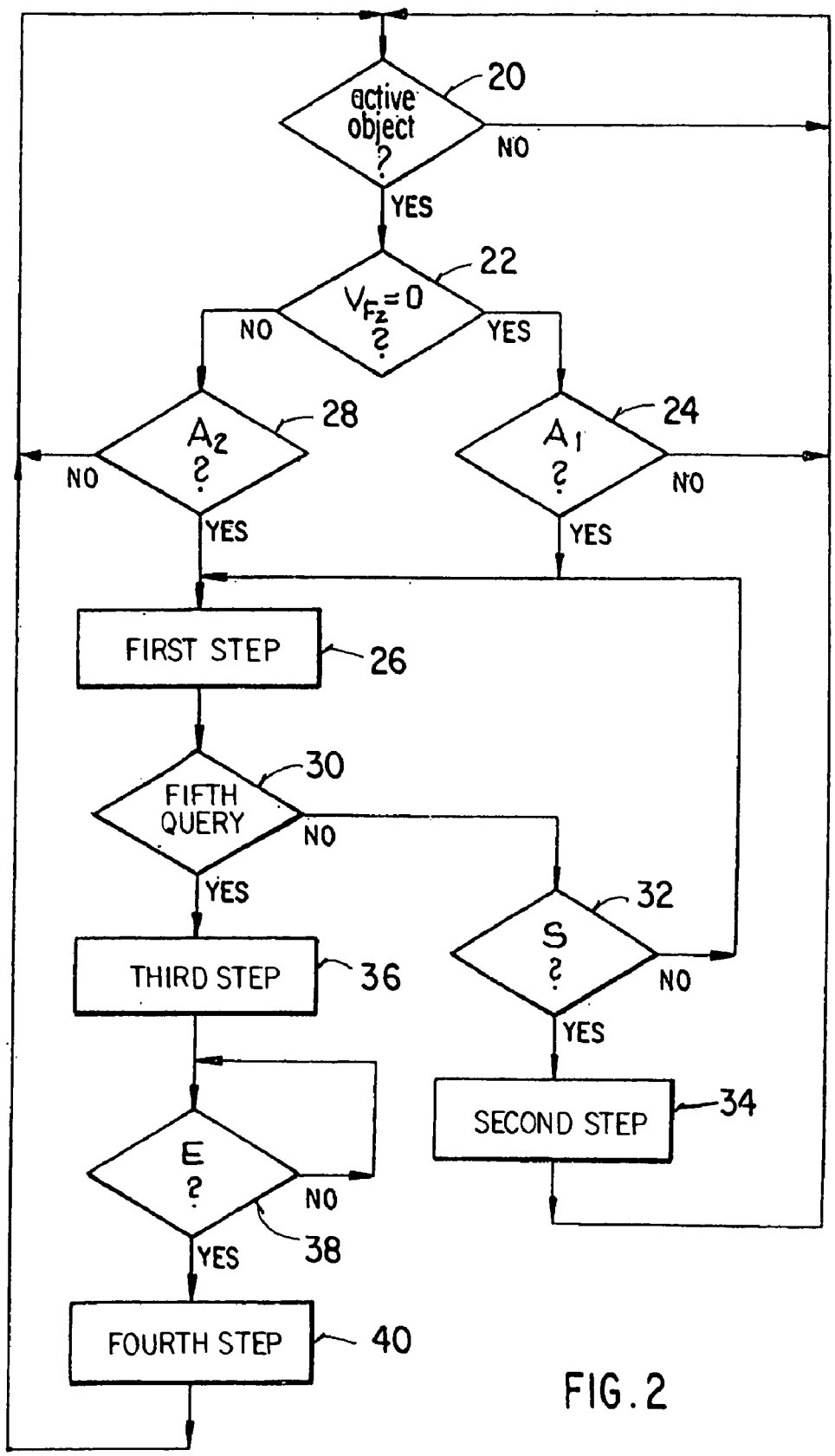
FIG. 2 is a flow diagram of an exemplary embodiment of the method according to the present invention.

The method for selecting a target vehicle 7 will now be explained with reference to FIG. 2. In a first query 20, the system checks whether the process for selecting a target vehicle 7 to control the relative distance between the vehicle 3 and the target vehicle 7 has been activated. In this first query 20, the system further checks whether an object has been detected within the detection range 13 of the sensor unit 11. If the process has been deactivated or if no object has been detected, this first query 20 is repeated.

If the process has been activated and an object 15 has been detected, the system checks in the next query 22 whether the longitudinal speed of the vehicle 3 exceeds a predefined first speed threshold value. The first speed threshold value is set to zero, for example, so that the second query 22 checks whether the longitudinal vehicle speed $v_{Fz}$ equals zero. If the answer is yes, a third query 24 checks a first selection condition $A_1$.

The selection condition can include several logically interlinked partial criteria. In the currently preferred embodiment described here, the first selection condition $A_1$ has three partial criteria, all of which must be satisfied for the first selection condition $A_1$ to be satisfied. For the first partial criterion, the relative distance d between the vehicle 3 and the object 15 detected by the sensor unit 11 is evaluated. If the relative distance d falls within a defined range, e.g., between three meters and twenty meters, then this first partial criterion is satisfied. The second partial criterion relates to the longitudinal object speed $v_{obj}$, which must be less than a defined second speed threshold value to satisfy the second partial criterion. For the third partial criterion of the first evaluation condition $A_1$ the system checks whether the lateral object speed $v_y$ is less than a defined third speed threshold value, which is e.g., approximately zero. Thus, in the present case, the third partial criterion is satisfied if the lateral speed of the object perpendicular to the driving direction 9 of the vehicle 3 is approximately zero.

If one of the three partial criteria of the first selection condition $A_1$ is not satisfied, then the first selection condition $A_1$ is likewise not satisfied and the process is continued with the first query 20. Otherwise, if all three partial criteria are satisfied, the first evaluation condition $A_1$ is also satisfied. In this case, the process is continued in a first step 26 in which the system indicates the detected object 15 as a selectable preceding vehicle 5 and thereby offers it for selection as the target vehicle 7 to the driver of the vehicle 3.

In principle, the indication that the detected object has been recognized as a selectable preceding vehicle 5 can be effected in any manner. In a preferred embodiment, a visual signal alerts the driver that the selection condition for the detected object 15 is satisfied and that the object is therefore a selectable preceding vehicle 5 that can be selected as a target vehicle 7 by the driver's manual confirmation. Acoustic and/or haptic indicator means could of course be used in addition or as an alternative to the visual display.

If the query 22 has determined that the longitudinal speed $V_{Fz}$ of the vehicle 3 does not equal zero, there is a fourth query 28 instead of the third query 24 to check whether a second selection condition $A_2$ is satisfied. Thus, the selection conditions are determined as a function of the longitudinal dynamics and, in particular the longitudinal speed $v_{Fz}$ of the vehicle 3. Depending on the longitudinal dynamics of the vehicle 3, the selection condition associated with the actual longitudinal dynamics of the vehicle 3 is selected among a plurality of defined selection conditions $A_1$, $A_2$.

According to the illustrated embodiment, the second selection condition A2 likewise consists of several partial criteria, all of which must be satisfied for the second selection condition $A_2$ to be satisfied. For the first partial criterion of the second selection condition $A_2$, the system evaluates the relative speed between the vehicle 3 and the detected object 15 in the driving direction 9, which can be determined from the difference between the longitudinal speed of the object $v_{obj}$ and the longitudinal speed $v_{Fz}$ of the vehicle 3. If the relative speed is less than a predefined fourth speed threshold value, then this first partial criterion of the second evaluation condition $A_2$ is satisfied. Furthermore, for the second partial criterion of the second evaluation condition $A_2$, the system evaluates the relative distance d in driving direction 9 of the vehicle 3. If this relative distance is less than a first distance threshold value, the second partial criterion is satisfied. Finally, in a third partial criterion of the second selection condition $A_2$, the longitudinal acceleration $a_{obj}$ of the object is compared with a first acceleration threshold value. If the longitudinal acceleration $a_{obj}$ of the object is less than the first acceleration threshold value, then the third partial criterion of the second selection condition $A_2$ is satisfied.

If even one of the partial criteria of the second selection condition $A_2$ is not satisfied, the second selection condition $A_2$ is likewise not satisfied and the process starts again with the first query 20. Otherwise, if the second selection condition $A_2$ is satisfied, the fourth query 28 is followed by the first step 26.

With the checking of the first or second selection condition $A_1$ or $A_2$, the current driving situation is evaluated in the form of dynamic parameters of the vehicle 3 or the object 15. The selection condition $A_1$ or $A_2$ is satisfied only if the corresponding selection $A_1$, $A_2$ shows that based on the current driving situation of the vehicle 3 or the object 15, the object 15 is suitable as a possible target vehicle 7.

After a selectable preceding vehicle 5 has been indicated and offered for selection to the driver of the vehicle 3 in the first step 26, the subsequent fifth query 30 checks whether the driver confirms the selectable preceding vehicle 5 as the target vehicle 7 by manually actuating a control element provided for this purpose. If there is no confirmation by the driver, a sixth query 32 is conducted after the fifth query 30, in which the system checks whether an abort condition S is satisfied, which like the selection conditions $A_1$, $A_2$, may consist of several logically interlinked abort criteria.

In the present case, the abort condition S has three abort criteria. For the first abort criterion, the system checks whether the relative distance d between the vehicle 3 and the selectable preceding vehicle 5 exceeds an upper distance limit. If yes, the first abort criterion is satisfied. For the second abort criterion, the system compares the longitudinal speed of the preceding vehicle 5, i.e., the longitudinal object speed $v_{obj}$ with a predefined upper speed limit. The second abort criterion is satisfied if the longitudinal object speed $v_{obj}$ exceeds the upper speed limit. A third abort criterion is satisfied if the detected object that was recognized as a selectable preceding vehicle 5 because it satisfied the selection conditions $A_1$, $A_2$ leaves the detection range 13 of the sensor unit 11. As soon as at least one of the three abort criteria is satisfied, the abort condition S is likewise satisfied and the process cancels the selectability of the detected object 15 in the second step 34, such that no preceding vehicle 5 is present anymore. The absence of a selectable preceding vehicle 5 is indicated to the driver. The process then restarts with the first query 20.

If the abort condition S is not satisfied, the sixth query 32 is again followed by the first step 26. As long as the driver has not confirmed the selectable preceding vehicle 5 as a target vehicle in the fifth query 30 and as long as the abort condition S is not satisfied in the sixth query 32, the process continues to execute the following cycle: first step 26, fifth query 30 and sixth query 32.

Once the driver confirms the selectable preceding vehicle 5 as the target vehicle 7, the system goes to a third step 36 after the fifth query 30 and activates the distance control mode of the vehicle 3. In the subsequent seventh query 38 the system checks whether a termination condition E is satisfied, which would cause the distance control mode to be switched off. As long as the termination condition E is not satisfied, the seventh query 38 is cyclically repeated. If the termination condition E is satisfied, the distance control mode is switched off in a fourth step 40. After the fourth step 40 the process restarts with the first query 20.

In the currently preferred embodiment, the system checks several termination criteria within the check for the termination condition E. If even one of the termination criteria is satisfied then the termination condition E is satisfied. The first three termination criteria correspond to the three abort criteria, which are checked in the sixth query 32 in the context of the abort condition S. For the fourth termination criterion, the system monitors whether the driver wants to cancel the distance control mode manually. This can be a permanent disabling of the process, e.g., by a corresponding control element, or only a temporary disabling of the distance control mode based on the current traffic situation, which can be effected, for example by pushing the accelerator pedal to the floor-also referred to as "kickdown".

If the process for controlling the distance is cancelled permanently, the system continues to cyclically execute the first query 20 after the fourth step 40, until the driver reactivates the process. If the process was disabled only temporarily, the system determines in the first query 20 that the process is still active and then continues with the second query 22. If the process according to the present invention reaches the fifth query 30 after a temporary interruption of the distance control mode, the system assumes the confirmation of the driver and reactivates the distance control mode in the second step 36.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for selecting a target vehicle located in front of a following vehicle in a driving direction of the following vehicle to control a distance between the following vehicle and the target vehicle, comprising recognizing a preceding vehicle selectable as the target vehicle when a sensor unit has detected an object in front of the following vehicle in the driving direction and a selection condition is satisfied for the object indicating a presence of the selectable preceding vehicle to a driver of the following vehicle and selecting the selectable preceding vehicle as a target vehicle by a confirmation of the driver wherein the selection condition is satisfied depending on an evaluation of dynamic parameters of the at least one of the following vehicle and the object, and selecting the selection conditions associated with actual longitudinal dynamics of the target vehicle among a plurality of defined selection conditions.

2. Method as claimed in claim 1, wherein the distance between the following vehicle and the object in the driving direction, and/or the relative speed between the following vehicle and the object in the driving direction are evaluated as vehicle dynamic parameters to check the selection condition.

3. Method as claimed in claim 2, wherein for a longitudinal speed of the following vehicle greater than a predeined first speed threshold value, a first selection condition applies, and for a longitudinal speed of the following vehicle that is less than or equal to the first speed threshold value, a second selection condition different from the first selection condition applies.

4. Method as claimed in claim 1, wherein at least one of longitudinal speed of the object in the driving direction, longitudinal acceleration of the object in the driving direction, the lateral speed of the object perpendicular to the driving direction, and the lateral acceleration of the object perpendicular to the driving direction are evaluated as vehicle dynamic parameters to check the selection condition.

5. Method as claimed in claim 1, wherein the selectability of the selectable preceding vehicle as the target vehicle is cancelled when an abort condition is satisfied.

6. Method as claimed in claim 5, characterized in that the abort condition is satisfied when the preceding vehicle has left a detection range of the sensor unit when the distance between the following vehicle and the preceding vehicle exceeds an upper distance limit, or when at least one of the longitudinal speed of the preceding vehicle and the longitudinal speed of the following vehicle exceeds an upper speed limit.

7. Method as claimed in claim 1, wherein a distance control mode of the following vehicle is activated when the driver has selected the target vehicle, such that automatic intervention in the longitudinal dynamics of the following vehicle occurs to maintain a safe distance.

8. Method as claimed in claim 7, wherein the distance control mode is capable of being disabled manually for a defined time period such that during the defined time period the following vehicle can be at less than the safe distance relative to the target vehicle.

9. Method as claimed in claim 7, wherein the distance control mode is terminated based on at least one of the following conditions: when a termination condition is satisfied, when the selectable preceding vehicle has left a detection range of the sensor unitU, when the distance between the following vehicle and the selectable preceding vehicle exceeds an upper distance limit, when at least one of a longitudinal speed of the selectable preceding vehicle and a longitudinal speed of the following vehicle exceeds an upper speed limit, and when the driver manually cancels the distance control mode.

10. Method as claimed in claim 9, wherein the distance control mode termination condition is satisfied when the selectable preceding vehicle exceeds an upper distance limit, when at least one of a longitudinal speed of the selectable preceding vehicle and a longitudinal speed of the following vehicle exceeds an upper speed limit, or when the driver manually cancels the distance control mode.

11. Method as claimed in claim 10, wherein the distance control mode is capable of being disabled manually for a defined time period such that during the defined time period the following vehicle can be at less than the safe distance relative to the target vehicle.

12. Method for selecting a target vehicle located in front of a following vehicle in a driving direction of the following vehicle to control a distance between the following vehicle and the target vehicle, comprising recognizing a preceding vehicle selectable as the target vehicle when a sensor unit has detected an object in front of the following vehicle in the driving direction and a selection condition is satisfied for the object indicating a presence of the selectable preceding vehicle to a driver of the following vehicle and selecting the selectable preceding vehicle as a target vehicle by a confirmation of the driver wherein the selection condition is satisfied depending on an evaluation of dynamic parameters of the at least one of the following vehicle and the object, wherein the selection condition is determined as a function of a longitudinal dynamic of the following vehicle, and for a longitudinal speed of the following vehicle greater than a predefined first speed threshold value, a first selection condition applies, and for a longitudinal speed of the following vehicle that is less than or equal to the first speed threshold value, a second selection condition different from the first selection condition applies.

* * * * *